US008325909B2

(12) United States Patent
Tashev et al.

(10) Patent No.: US 8,325,909 B2
(45) Date of Patent: Dec. 4, 2012

(54) ACOUSTIC ECHO SUPPRESSION

(75) Inventors: Ivan J. Tashev, Kirkland, WA (US); Alejandro Acero, Bellevue, WA (US); Nilesh Madhu, Bochum (DE)

(73) Assignee: Microsoft Corporation, Redmond, WA (US)

(*) Notice: Subject to any disclaimer, the term of this patent is extended or adjusted under 35 U.S.C. 154(b) by 851 days.

(21) Appl. No.: 12/145,579

(22) Filed: Jun. 25, 2008

(65) Prior Publication Data
US 2009/0323924 A1 Dec. 31, 2009

(51) Int. Cl.
*H04M 9/08* (2006.01)
*H04B 3/20* (2006.01)

(52) U.S. Cl. .............. 379/406.05; 379/406.14; 370/287; 370/289

(58) Field of Classification Search .......... None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |

(Continued)

FOREIGN PATENT DOCUMENTS

CN 201254344 B 6/2010

(Continued)

OTHER PUBLICATIONS

Cohen, Israel; "Noise Sectrum Estimation in Adverse Environments: Improved Minima Controlled Recursive Averaging;" Sep. 2003; IEEE transactions on speech and audio processing; vol. 11, No. 5; pp. 466-475.*

(Continued)

*Primary Examiner* — Fan Tsang
*Assistant Examiner* — Jeffrey Lytle
(74) *Attorney, Agent, or Firm* — Microsoft Corporation (57) ABSTRACT

Sound signals captured by a microphone are adjusted to provide improved sound quality. More particularly, an Acoustic Echo Reduction system which performs a first stage of echo reduction (e.g., acoustic echo cancellation) on a received signal is configured to perform a second stage of echo reduction (e.g., acoustic echo suppression) by segmenting the received signal into a plurality of frequency bins respectively comprised within a number of frames (e.g., 0.3 s to 0.5 s sound signal segments) for a given block. Data comprised within respective frequency bins is modeled according to a probability density function (e.g., Gaussian distribution). The probability of whether respective frequency bins comprise predominantly near-end signal or predominantly residual echo is calculated. The output of the acoustic echo suppression is computed as a product of the content of a frequency bin in a frame and the probability the frequency bin in a frame comprises predominantly near-end signal, thereby making near-end signals more prominent than residual echoes.

20 Claims, 7 Drawing Sheets

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,894,513 A | 4/1999 | Nasu |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,282,176 B1 | 8/2001 | Hemkumar |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,622,030 B1 | 9/2003 | Romesburg et al. |
| 6,633,294 B1 | 10/2003 | Rosenthal et al. |
| 6,640,202 B1 | 10/2003 | Dietz et al. |
| 6,658,107 B1 | 12/2003 | Sorqvist et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,099 B1 * | 2/2006 | Zhang et al. ............ 379/406.03 |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,139,703 B2 | 11/2006 | Acero et al. |
| 7,170,492 B2 | 1/2007 | Bell |
| 7,177,416 B1 * | 2/2007 | Zhang et al. ............ 379/387.01 |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,697,700 B2 * | 4/2010 | Mao ............................ 381/94.3 |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0220800 | A1* | 11/2004 | Kong et al. .................. 704/205 |
| 2005/0249347 | A1* | 11/2005 | Derkx et al. ............. 379/406.06 |
| 2006/0122832 | A1 | 6/2006 | Takiguchi et al. |
| 2006/0193464 | A1 | 8/2006 | Diethorn et al. |
| 2006/0217969 | A1 | 9/2006 | Sukkar et al. |
| 2007/0036343 | A1 | 2/2007 | Sudo et al. |
| 2007/0058799 | A1* | 3/2007 | Sudo ....................... 379/406.01 |
| 2008/0026838 | A1 | 1/2008 | Dunstan et al. |
| 2008/0031467 | A1 | 2/2008 | Haulick et al. |
| 2009/0089054 | A1* | 4/2009 | Wang et al. .................. 704/233 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2006114102 A1 | 11/2006 |

OTHER PUBLICATIONS

Wallin, "Combining Acoustic Echo Cancellation and Suppression", Oct. 9, 2003, 71 Pages, Linköping University, Department of Electrical Engineering.

Feder, "Maximum Likelihood Noise Cancellation Using the EM Algorithm", IEEE Transactions on acoustic, speech, and signal processing, vol. 37, No. 2. Feb. 1989, pp. 204-216.

Sriram Srinivasan, "Knowledge-Based Speech Enhancement", IEEE Transactions on Speech and Audio Processi, 2005, 176 Pages.

Bilmes, "A Gentle Tutorial of the EM Algorithm and its Application to Parameter Estimation for Gaussian Mixture and Hidden Markov Models"Apr. 1998, 15 Pages.

Lee, et al, "A Statistical Model-Based Residual Echo Suppression", IEEE Signal Processing Letters, vol. 14, No. 10, Oct. 2007, pp. 758-761.

Carlos Avendano, "Acoustic echo suppression in the STFT domain" Oct. 2001, IEEE Workshop on Application of signal processing to audio and acoustics, pp. 175-178.

Chhetri; et al, "Regression-Based Residual Acoustic Echo Suppression", IWAENC 2005, International Workshop on Acoustic Echo and Noise Control, Sep. 12-15, 2005, 4 Pages.

Kallinger; et al, "Residual Echo Estimation With the Help of Minimum Statistics",IEEE Benelux Signal Processing Symposium (SPS-2002), Leuven, Belgium, Mar. 21-22, 2002, 4 Pages.

McAulay: et al, "Speech Enhancement Using a Soft-Decision Noise Suppression Filter", IEEE Transactions on Acoustics, Speech, and Signal Processing, vol. ASSP-28, No. 2, Apr. 1980, pp. 137-145.

Faller; et al, "Stereo Acoustic Echo Control Using a Simplified Echo Path Model", IWAENC 2006—Paris—Sep. 12-14, 2006, 4 Pages.

Faller; et al, "Suppressing Acoustic Echo in a Spectral Envelope Space", IEEE Transactions on Speech and Audio Processing, vol. 13, No. 5, Sep. 2005, pp. 1048-1062.

Enzner; et al, "Unbiased Residual Echo Power Estimation for Hands-Free Telephony", 2002 IEEE, pp. 1893-1896.

ITU-T Telecommunication Standardization Sector of ITU, ITU-T Recommendation p. 862, "Perceptual Evaluation of Speech Quality (PESQ): An Objective Method for End-to-End Speech Quality Assessment of Narrow-Band Telephone Networks and speech Codec", Feb. 2001.

ITU-T Telecommunication Standardization Sector of ITU, ITU-T Recommendation p. 862.2, "Wideband Extension to Recommendation p. 862 for the Assessment of Wideband Telephone Networks and Speech Codecs", Nov. 2007.

Digital Speech Transmission-Enhancement, Coding and Error Concealment, Peter Vary and Rainer Martin, John Wiley & Sons, Ltd., New York, 2006, pp. 1-627.

Detection, Estimation, and Modulation Theory—Part 1, Harry L. Van Trees, John Wiley & Sons, Ltd., New York, 1968, pp. 1-697.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", Nov. 2005, pp. 41-48, University of Auckland (CITR), New Zealand.

Aggarwal et al., "Human Motion Analysis: A Review", IEEE Nonrigid and Articulated Motion Workshop, 1997, pp. 90-102, University of Texas at Austin, Austin, TX.

Shao et al., "An Open System Architecture for a Multimedia and Multimodal User Interface", Aug. 24, 1998, pp. 1-8, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, pp. 1-35, Germany.

Hasegawa et al., "Human-Scale Haptic Interaction with a Reactive Virtual Human in a Real-Time Physics Simulator", Jul. 2006, vol. 4, No. 3, Article 6C, pp. 1-12, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", Jul. 26, 2001, pp. 1-121, The Robotics Institute, Carnegie Mellon University, Pittsburgh, PA.

He, "Generation of Human Body Models", Apr. 2005, pp. 1-111, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, pp. 1-145, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, pp. 1-22, European Computer-Industry Research Center GmbH, Munich, Germany.

Freeman et al., "Television Control by Hand Gestures", Dec. 1994, pp. 1-7, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, pp. 602-605, IEEE Transactions on Pattern Analysis and Machine Intelligence.

Granieri et al., "Simulating Humans in VR", The British Computer Society, Oct. 12, 1994, pp. 1-15, Academic Press.

Brogan et al., "Dynamically Simulated Characters in Virtual Environments", Sep./Oct. 1998, pp. 58-69, vol. 18, Issue 5, IEEE Computer Graphics and Applications.

Fisher et al., "Virtual Environment Display System", ACM Workshop on Interactive 3D Graphics, Oct. 23-24, 1986, pp. 1-12, Chapel Hill, NC.

"Virtual High Anxiety", Tech Update, Aug. 1995, pp. 22 (1 page).

Sheridan et al., "Virtual Reality Check", Technology Review, Oct. 1993, pp. 22-28, (9 pages total) vol. 96, No. 7.

Stevens, "Flights into Virtual Reality Treating Real World Disorders", The Washington Post, Mar. 27, 1995, Science Psychology, 2 pages.

"Simulation and Training", 1994, pp. 1-6, Division Incorporated.

* cited by examiner

ACOUSTIC ECHO SUPPRESSION

BACKGROUND

In recent history, technology has allowed the world to become increasingly integrated and globalized. Many companies are now global entities, comprising offices and manufacturing sites geographically dispersed throughout the world. People also are more likely than ever to change their residence multiple times during their lives. With such an integrated, yet geographically diverse world, people often need to communicate with others who are far away. In order to facilitate this communication, teleconferencing and video conferencing are commonplace. Teleconferencing connects two or more parties over a network. The parties often rely upon a conferencing system that may include a microphone and a speaker. Video conferencing further includes a camera and a video monitor allowing the parties to converse while viewing video images of each other.

Teleconferencing and video conferencing systems both commonly suffer from the problem of acoustic echo, which is a delayed and distorted version of an original sound reflected back to its source. Traditionally, a system prone to acoustic echo problems includes a speaker/microphone pair on both ends (called the near-end and the far-end) of the connection. When near-end participants talk, their voices are picked up by the near-end microphone, transmitted to the far-end, and presented as a sound signal via the far-end speaker. The far-end microphone will also pick up this sound signal, directly or indirectly, and the far-end system will send it back to the near-end. This causes the near-end participants to hear a delayed and distorted version of their own speech, which decreases the perceived audio quality.

Acoustic echo reduction (AER) systems are part of practically all speakerphone (e.g., teleconferencing and/or video-conferencing) communication systems. Modern AER systems usually comprise a two phase process to reduce acoustic echo problems. An Acoustic Echo Canceller will perform a first stage of acoustic echo reduction (e.g., Acoustic Echo Cancellation (AEC)) resulting in a signal that has a remaining residual echo (e.g., a portion of the original acoustic echo that could not be reduced). An Acoustic Echo Suppressor will perform a second stage of echo reduction (e.g., Acoustic Echo Suppression (AES)) to reduce the residual echo in the signal output from the Acoustic Echo Canceller, thereby further improving the Echo Return Loss Enhancement (ERLE) of the AER system.

Although the problem of echo reduction has been described in the context of teleconferencing and video conferencing, it will be appreciated that it can also occur whenever a speaker and microphone are configured to be in a closed loop.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, sound signals captured by a microphone are adjusted to provide an improvement in acoustic echo suppression of captured sound according to an algorithm. More particularly, an Acoustic Echo Reduction system which performs a first stage of echo reduction (e.g., acoustic echo cancellation) on a received signal is configured to perform a second stage of echo reduction (e.g., acoustic echo suppression) by segmenting an incoming signal into a plurality of blocks and determining the probability of whether or not respective blocks are predominantly comprised of acoustic echo or near-end signals.

Essentially, after acoustic echo cancellation (AEC) has been performed, an acoustic echo suppressor receives a signal comprising a residual echo (e.g., an echo not removed by the AEC). The received signal is temporally segmented into a plurality of blocks respectively comprising a number of audio frames (e.g., 0.01 s to 0.05 s sound signal segments) for a plurality of frequency bins. Data (e.g., the segmented received signal) comprised within respective frequency bins is modeled according to an appropriate probability density function (e.g., Gaussian distribution) for each of two mutually exclusive cases: first, that a frequency bin in an audio frame (frame) comprises data that is mainly near-end signals (e.g., signals produced at the receiver's end), and second that a frequency bin in a frame comprises data that is mainly residual echo (e.g., echoes not removed by the AEC). The probability density functions are parameterized by unknown variables appropriate to the density functions chosen for the model, and which constitute a vector of unknown parameters. These parameters need to be determined in order to compute a probability of the content of frequency bins in a frame corresponding to the respective hypotheses (e.g., residual echo or near-end signal). To this end, a log likelihood function is formed using the vector of unknown parameters. The log likelihood function is enhanced (e.g., optimized) according to an algorithm (e.g., an Expectation Maximization algorithm) to determine the vector of unknown parameters. These parameters are then used to calculate the probabilities of respective cases. An output of the AES for each frequency bin in each frame is computed as a product of the content of the frequency bin for that frame and the probability that the frequency bin in that frame comprises predominantly near-end signal, thereby making contributions to the AES output from frequency bins with a high probability of comprising predominantly near-end signal more prominent and contributions from frequency bins with a low probability of comprising predominantly near-end signal less prominent. Consequently, residual echo is decreased in the received signal resulting in an improved sound quality (e.g., increase in ERLE, increase in MOS).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

During a telephone conversation performed over a speakerphone a speaker's voice (e.g., user's voice) and sound output from the speakerphone (e.g., voice of a person on the other end of the line) can become mixed together as the sound output from the speakerphone, and its echoes in the room (e.g., off walls, furniture, etc.) may be picked up by the microphone. This mixture of the speaker's voice and speakerphone output reduces the quality of the audio experience for the person on the other end of the line. To address this problem Acoustic Echo Reduction (AER) systems, performing acoustic echo cancellation and acoustic echo suppression, are present in many audio systems comprising a speaker and a microphone.

As provided herein, an algorithm is set forth for improved acoustic echo suppression (AES) of a sound signal (e.g., user voice and speakerphone signal) received by a microphone. The algorithm temporally segments sound signals received from an Acoustic Echo Canceller and stores them in blocks (e.g., memory blocks comprising data) comprising multiple short audio frames (e.g., 0.01 s to 0.1 s of sound signal) for a plurality of frequency bins. For respective frequency bins, data (e.g., segmented sound signals) comprised within respective blocks of a frequency bin is modeled to determine a source (e.g., near-end signal or residual echo) of the sound signal based upon a probability density function (e.g., Gaussian distribution). In particular, a probability that a frequency bin in a frame is mainly comprised of near-end signals (e.g., signals produced at a receiver's end) and a probability that the frequency bin comprises mainly residual echo (e.g., echoes not removed by the Acoustic Echo Canceller) are calculated. An output of the AES is computed from a product of the content of the frequency bin and the probability of the frequency bin comprising mainly a near-end signal, thereby reducing residual echo in the captured sound and improving overall captured sound quality (e.g., improve Mean Opinion Score (MOS) and Echo Return Loss Enhancement (ERLE)).

Figure 1:
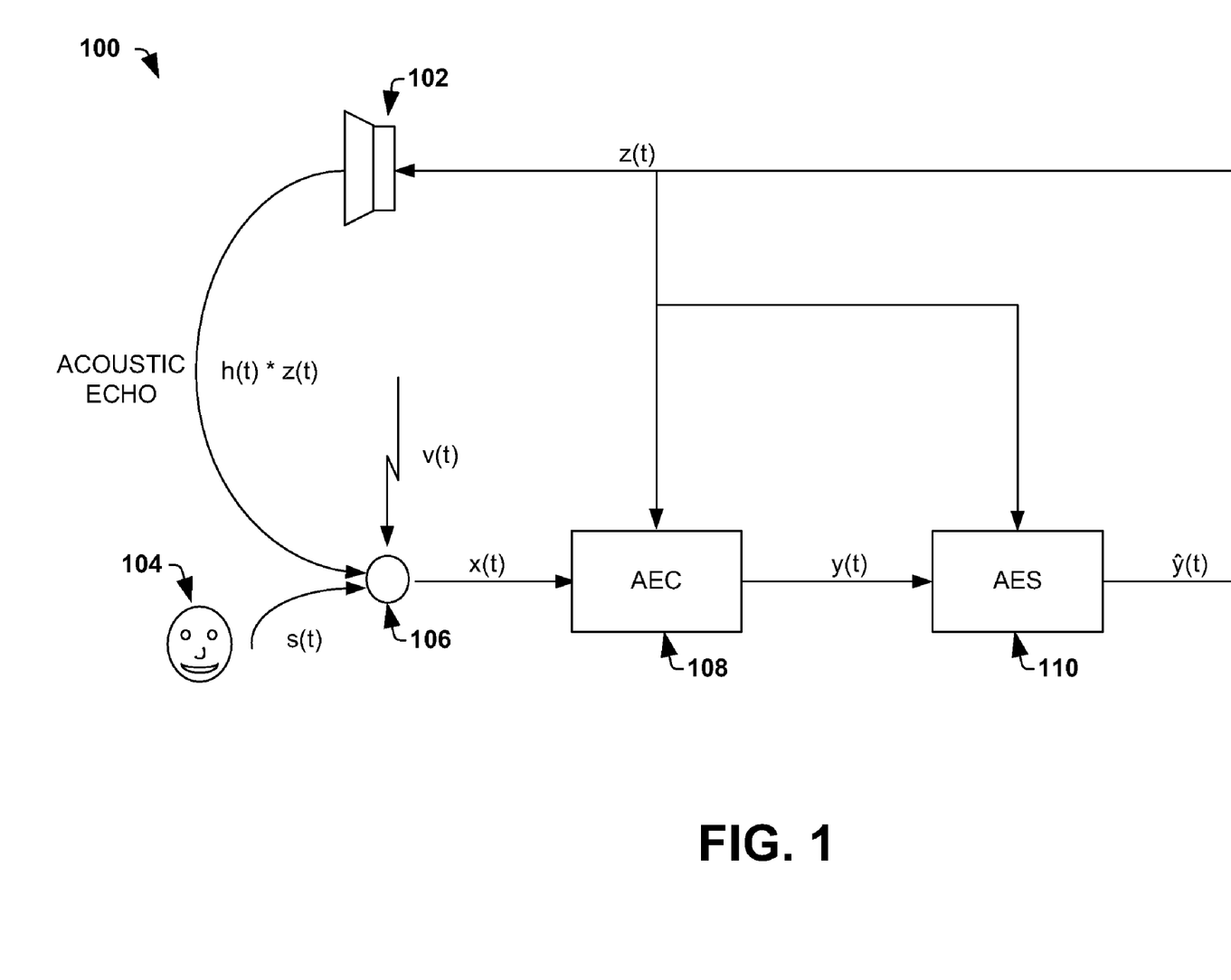
FIG. 1 illustrates a block diagram of a typical Acoustic Echo Reduction system.

FIG. 1 illustrates a block diagram of a typical Acoustic Echo Reduction (AER) system 100. The AER system 100 comprises an Acoustic Echo Canceller 108 which performs a first stage of echo reduction (acoustic echo cancellation (AEC)) on captured sound signals and an Acoustic Echo Suppressor 110 which performs an additional second stage of echo reduction (acoustic echo suppression (AES)). A speaker 102 outputs a far-end signal z(t) (e.g., a sound from another party output by a telephone associated with a speaker). The far end signal z(t) will disperse through a room comprising the speaker 102 and a microphone 106 (e.g., a speakerphone system) resulting in the echo signal which is described by the convolution of the far end signal z(t) and a room impulse response term h(t) (e.g., z(t)*h(t), in time, which is approximated by the product Z(f).H(f) in frequency). The room impulse response describes how the far end signal z(t) changes after it leaves the speaker 102. The microphone 106 captures a sound input x(t) comprising a near-end speech s(t) (e.g., voice of the telephone user 104), a near noise $\tilde{v}(t)$, and the convolution of the far end signal z(t) and the room impulse response term h(t). The near-end speech s(t) and the near-end noise $\tilde{v}(t)$ are collectively referred to as the near-end signal. The sound x(t) captured by the microphone 106 is sent to the Acoustic Echo Canceller 108. The Acoustic Echo Canceller (AEC) 108 is a linear adaptive filter which performs a first stage of echo reduction to remove echo from the captured signal. A residual signal y(t) is output by the AEC. The residual signal y(t) comprises a near-end signal and a residual echo, and is input into the Acoustic Echo Suppressor (AES) 110 which is configured to perform additional echo reduction of the residual signal by means of acoustic echo suppression according to the algorithm provided herein and which is also configured to output a signal $\hat{y}(t)$ The AER system 100 of FIG. 1 can be incorporated into a wide variety of electronic devices to provide improved echo reduction. For example, a cellular phone comprising a transmission device could incorporate the AER system 100 of FIG. 1 for improved echo reduction while operating in a speakerphone mode. Similarly, a video conferencing system comprising a visual display unit and a visual recording device could comprise the AER system 100 of FIG. 1, thereby providing a video conferencing system that offers increased Echo Return Loss Enhancement (ERLE) while providing a mean opinion score comparable to state of the art acoustic echo suppression systems without requiring a user to use a headset or telephone receiver. It will be appreciated that the inventors have contemplated use of the AER system 100 of FIG. 1 for use in a wide variety of applications.

Figure 2:
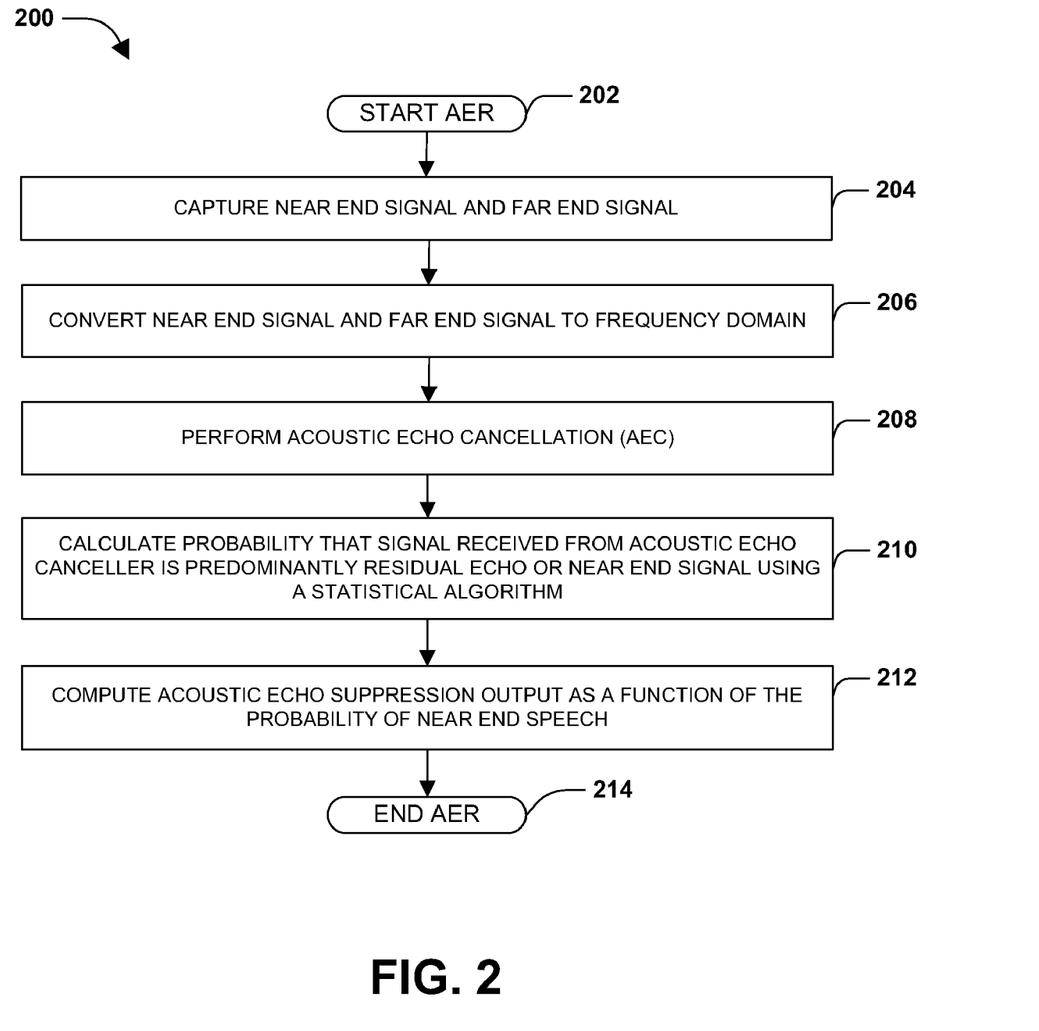
FIG. 2 is a flow chart illustrating an exemplary method of acoustic echo suppression as provided herein.

FIG. 2 illustrates a flow chart showing an exemplary method 200 of acoustic echo reduction (AER). More particularly, the method 200 further reduces echoes in received audio signals beyond the AEC performed by the Acoustic Echo Canceller using a probabilistic approach to estimate the AES filter. A received signal x(t) is segmented into temporally overlapping frames (e.g., 50% overlapping frames, wherein each frame is a 0.01 to 0.05 second segment of the received signal usually comprising 160-512 signal samples), which are grouped into blocks (e.g., memory blocks comprising data) according to its frequency and time of capture. Respective frequency bins from each frame are identified as comprising predominantly near-end signal or predominantly residual echo. Frequency bins that are identified as comprising predominantly residual echo may be suppressed according to a calculated probability of their data content (e.g., frequency bins from each frame comprised within blocks have their signals multiplied by their probability of comprising predominantly near-end signal, thereby reducing the contribution of frequency bins with a low probability of comprising near-end signal to the AES output $\hat{y}(t)$) resulting in an AES output $\hat{y}(t)$ comprising less residual echo.

While methods of this disclosure (200, 300 and 400) refer to calculation of a probability for frequency bins in a frame, it will be appreciated that the methods provided herein can also be used with various subsets of the data stored in blocks (e.g., blocks, frames). For example, method 200 may be performed on an entire block of data, whereby respective blocks are identified as comprising predominantly near-end signal. An AES output is calculated, for each frequency bin k, as the product of the content of that block for that frequency bin and the probability that the block for respective frequency bins comprises predominantly near-end signal. In general, analyzing smaller subsets of data will result in a finer analysis of the received signal and likely improved resulta. However, the smaller the subset analyzed, the more computationally demanding the method will be.

At 204 the near-end signal and a convolution of the far end signal z(t) and the room impulse response h(t) are captured by a microphone 106. In alternative embodiments, a plurality of microphones arranged in varying geometric layouts may also capture the far end signal z(t) filtered by the room impulse response $h_m(t)$ corresponding to the respective microphone (e.g., where m denotes the microphone).

The captured signal (e.g., the near-end signal s(t)+$\tilde{v}$(t)) and the convolution of the far end signal and room impulse, h(t) *z(t)) are converted from the time domain (denoted as x(t)) to the frequency domain (denoted X(f)) at 206. Conversion to the frequency domain can be performed using a Discrete Fourier Transform (DFT), or a Fast Fourier Transform (FFT), or Modulated Complex Lapped Transformation (MCLT), for example. Respective audio frames (frames) are converted to the frequency domain and presented as a vector of complex numbers with the same size (e.g., number of elements) as the number of samples. Each element of the vector is called a frequency bin.

At 208 acoustic echo cancellation (AEC) is performed. In general, frequency bins are independent of each other so that the AEC's processing and decisions for the k-th frequency bin of the n-th frame is based on the k-th frequency bin of the current (e.g., n-th) and several previous frames (e.g., (n−1)-th, (n−2)-th, etc.) in the block. For example, each block may contain 5-10 consequent frames (e.g., the current and several from the past). During processing all processing is done on the current frame n (e.g., the current frame is processed, the next frame arrives, the oldest frame is dropped and the processing repeats on the block of same size). For respective frames, AEC attempts to subtract the loudspeaker signal from the microphone signal (e.g., by computing the transfer function of the loudspeaker). It will be appreciated that AEC can be performed according to a number of acoustic echo cancellation algorithms which fall outside of the scope of this disclosure. AEC reduces a portion of an acoustic echo but fails to reduce the entire acoustic echo. The portion of the acoustic echo remaining after AEC is called the residual or residual echo. Therefore, the residual signal Y(k,n) output from the AEC comprises the near-end signal and the residual echo not suppressed by the AEC. The resultant frequency domain signals (e.g., denoted as capital letters) output from the AEC is:

$$Y(k,n) = (H(k,n) - \hat{H}(k,n))Z(k,n) + S(k,n) + \tilde{V}(k,n)$$

where $\hat{H}$(k,n) is an estimate of the room impulse response from the Acoustic Echo Canceller, k indicates a discrete frequency bin, and n indicates a frame number. The X(k,n) notation emphasizes a discrete per bin (k), per frame (n) processing applied in the short-time frequency domain.

A probability that a residual signal is predominantly a residual echo or the near-end signal is calculated by the Acoustic Echo Suppressor at 210. In one particular example, an Expectation Maximization algorithm can be used in the calculation. In other examples, alternative statistical algorithms can be used to determine the unknown parameter vector parameterizing the probability density functions. Frames (e.g., obtained by a single transform of a set of audio samples into the frequency domain) comprising a residual signal are received from the Acoustic Echo Canceller and stored in blocks (e.g., sets of frames). A probability that respective subsets of a block (e.g., a block or a frame) comprise predominantly near-end or residual echo may be calculated separately per frame or per block. The probabilities that a frequency bin from the current frame comprises data that is either predominantly a residual echo or predominantly a near-end signal are mutually exclusive of each other and therefore, if a probability of a frequency bin from the current frame comprising predominantly residual echo is increased, a probability of a frequency bin from the current frame comprising predominantly near-end voice is decreased. Moreover, any increase in overall near-end signal decreases the impact of overall residual echo for a signal output from the Acoustic Echo Suppressor.

At 212 an output of acoustic echo suppression (AES) is computed. A particular signal output from the AES is computed separately for respective frequency bins k of blocks b. For respective frequency bins in a frame, an output of the AES can be equal to the signal stored in that frequency bin multiplied by the probability that a frequency bin from the current frame comprises predominantly signals from the near-end. For example, an output of AES $\hat{Y}_b(k)$ can be written as:

$$\hat{Y}_b(k) = P(\mathcal{H}_0^{k,N}) Y_N(k)$$

where $P(\mathcal{H}_0^{k,N})$ is a probability that a signal received in a k-th frequency bin of the current frame n is a near-end signal and $Y_N(k)$ is the residual signal (in the frequency domain) stored in a k-th frequency bin of the current frame n of block b (where n denotes the current frame, and N the total number of frames in a block). This method of AES reduces the impact of frequency bins that have a low probability of comprising predominantly near-end signals (e.g., reduces the impact of frequency bins in a frame having a high probability of comprising predominantly residual echo) relative to the impact of frequency bins in a frame that have a high probability of comprising predominantly near-end signals for the signal output from the Acoustic Echo Suppressor $\hat{Y}_b(k)$. Therefore, the signal output from the Acoustic Echo Suppressor $\hat{Y}_b(k)$ has a reduced residual echo and improved overall sound quality (e.g., improved Mean Opinion Score (MOS) and/or Echo Return Loss Enhancement (ERLE)). Once a given audio frame is processed through AEC and AES it is converted back to the time domain and an output waveform is synthesized.

Figure 3:
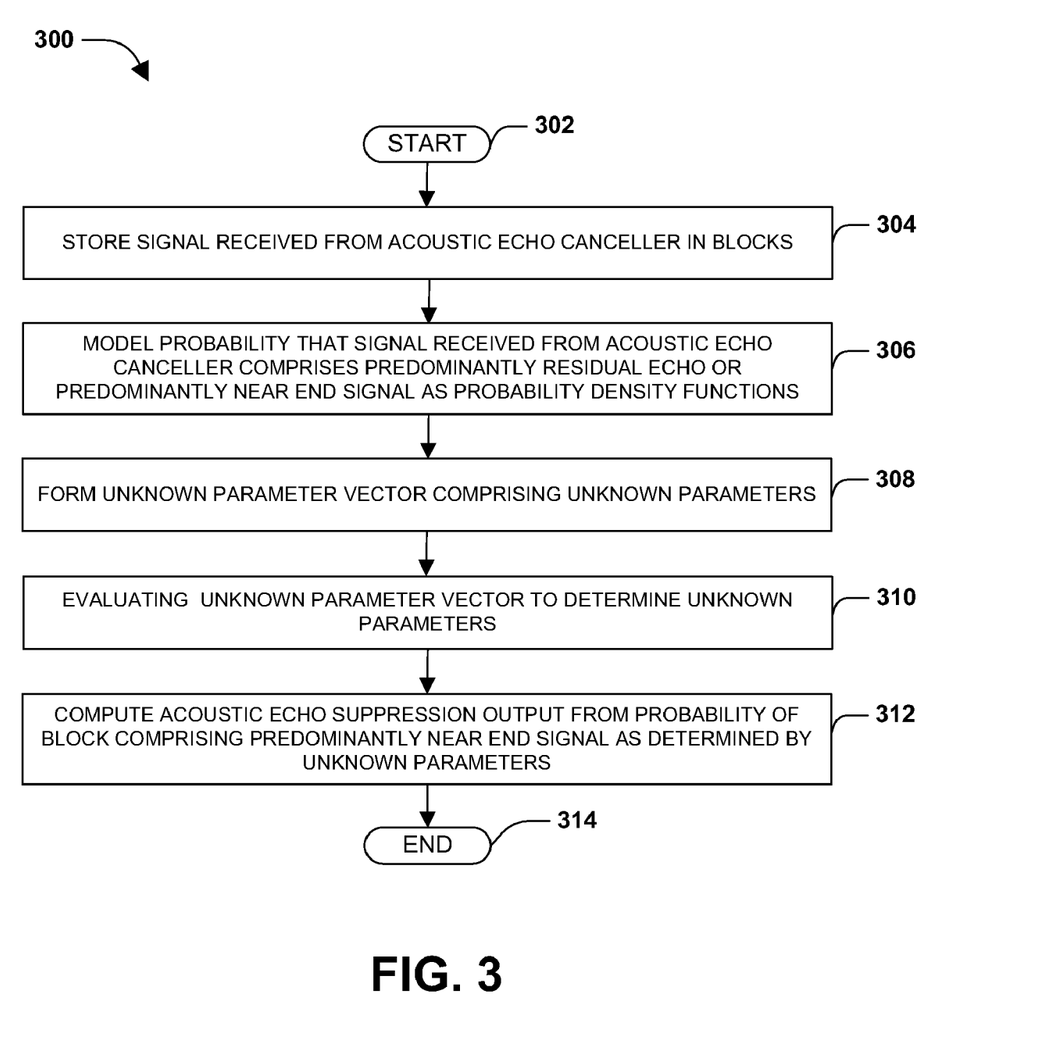
FIG. 3 is a flow chart illustrating an exemplary method of classifying residual output of an Acoustic Echo Canceller as either predominantly residual echo or near-end signal.

FIG. 3 illustrates a flow chart illustrating a more in depth example of calculating a probability that a signal output from the Acoustic Echo Canceller is either predominantly a residual echo or predominantly a near-end signal. More particularly, method 300 serves to identify portions of a residual signal as a near-end signal or a residual echo by breaking the residual signal up into blocks according to their frequency and time of capture, and calculating a probability that respective frequency bins in the current frame are either predominantly a near-end signal or residual echo. Respective frequency bins of a residual signal are adjusted according to a probability the frequency bin comprises predominantly a near-end signal thereby reducing the residual echo of the signal output from the Acoustic Echo Suppressor. Accordingly, captured sound quality (e.g., reduced Echo Return Loss Enhancement (ERLE) and/or mean opinion score comparable (MOS)) can be improved by reducing the impact of frames of data comprising predominantly residual echo.

Figure 4:
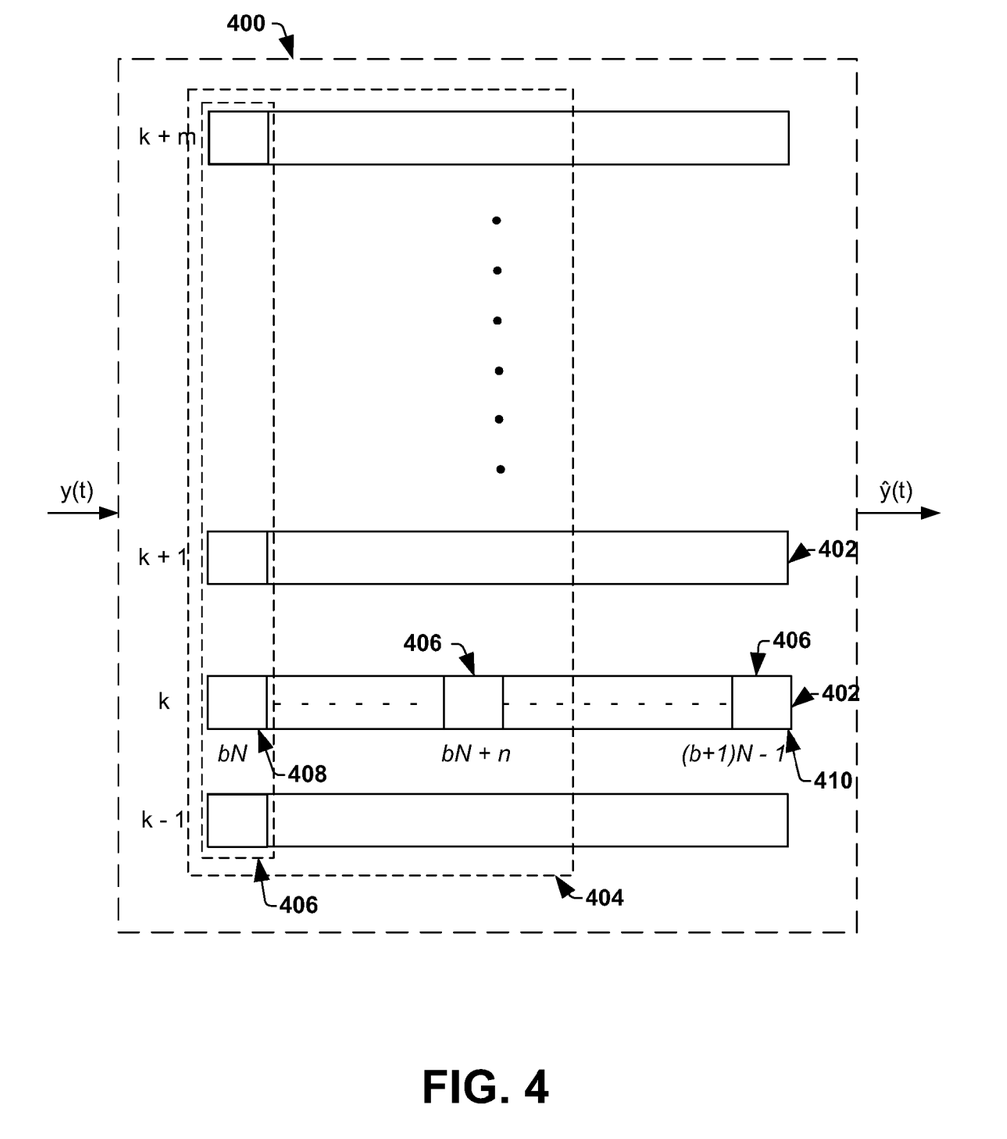
FIG. 4 illustrates an exemplary selection of a block of audio frames in conjunction with a method of Acoustic Echo Suppression.

At 304 signals received from the Acoustic Echo Canceller are stored in blocks. Respective blocks comprise data corresponding to residual signals of a particular frequency received during a time period of N frames (e.g., 0.01 s to 0.05 s segments of received signal). There is usually a 10 to 20 ms delay between frames, for example. FIG. 4 illustrates a block diagram of an exemplary Acoustic Echo Suppressor data structure 400 of a block of audio frames in frequency domain. For respective frequency bins k 402, the residual signal from the Acoustic Echo Canceller may be stored in blocks 404 comprising N frames 406. For example, for a frequency bin k, a block b comprising N frames may be written as:

$$Y_b(k) = (Y(k,bN), \ldots, Y(k,(b+1)N-1))^T$$

where b is a block number, k is a frequency bin, and N is a frame number. The first frame 408 of a frequency bin k will comprise a signal $Y(k,bN)$, while the Nth frame 410 will comprise a signal $Y(k,(b+1)N-1)$. The residual signal is processed in a manner that considers one block at a time.

At 306 a probability that a residual signal received from the Acoustic Echo Canceller comprises predominantly a residual echo (e.g., the output of the loud speaker that wasn't suppressed by the AEC) or predominantly a near-end signal (e.g., near-end signal and near-end noise) is modeled as realizations of a stochastic process with defined probability density functions for respective frames n of respective frequency bins k. Since the residual signal can be estimated as realizations of random variables, the probability of observing a signal $Y(n)$ given a far end signal $Z(n)$ can be calculated as the sum of a probability of a residual signal comprising predominantly a residual echo and a probability of a residual signal comprising predominantly a near-end signal (where the frequency bin index k has been dropped for convenience as all subsequent processing is done independently for each frequency bin). The probability of the received signal comprising predominantly a residual echo or predominantly a near-end signal can also further modeled as a probability density function comprising one or more unknown parameters. In one particular example, the probability density function can be a Gaussian distribution $\aleph$ and can give a near-end signal probability of:

$$p(Y(n)|\mathcal{H}_0, Z(n)) \sim \aleph(0, \Psi_{v1})$$

where $H_0$ denotes the hypothesis that the frequency bin comprises predominantly near-end signal, $Z(n)=(Z(bN+n-L), \ldots, Z(bN+n))^T$ is the far end signal, and $\Psi_{v1}$ is the unknown parameter. Similarly, a Gaussian distribution $\aleph$ can be used to give a residual echo probability of:

$$p(Y(n)|\mathcal{H}_1, Z(n)) \sim \aleph(W^H Z(n), \Psi_{v2})$$

where $H_1$ denotes a residual echo, $Z(n)=(Z(bN+n-L), \ldots, Z(bN+n))^T$ is the far end signal, $\Psi_{v2}$ is an unknown parameter, and W is a vector comprising regression coefficients.

At 308 a vector comprising unknown parameters (unknown parameter vector) is formed. The unknown parameter vector comprises inter alia the probability of a frequency bin in a frame comprising predominantly residual echo $P(H_1)$, the probability of a frequency bin in a frame comprising predominantly near-end signal $P(H_0)$, the unknown parameters $\Psi_{v1}$ and $\Psi_{v2}$, and the vector W comprising regression coefficients.

At 310 the parameters comprising the unknown parameter vector are determined. In one particular example, illustrated in FIG. 4, the unknown parameter vector may be determined using an Expectation Maximization algorithm for respective frequency bins k and respective block b of N frames n. The Expectation Maximization algorithm solves a log likelihood function of the probability of observing a signal $Y(n)$ given a far end signal $Z(n)$ (e.g., defined in act 306 by the sum of the probability density functions) using iterative process that finds the maximum likelihood estimates of the unknown parameters by alternating between performing an expectation step, which computes an expectation of the likelihood by including latent variables as if they were observed, and a maximization step, which computes the maximum likelihood estimates of the unknown parameters by maximizing the expected likelihood found during the expectation step. The parameters found on the maximization step are then used to begin another estimation step, and the process can be repeated until the unknown parameters are determined.

At 312 the probability of a frequency bin in a frame comprising predominantly a near-end signal, as determined by the unknown parameters, is multiplied by the content of the associated frequency bin (e.g., unknown parameters are applied to perform act 212 in FIG. 2) thereby producing an output from the Acoustic Echo Suppressor with a reduced residual echo and a higher perceptive sound quality than produced by the AEC alone.

Figure 5:
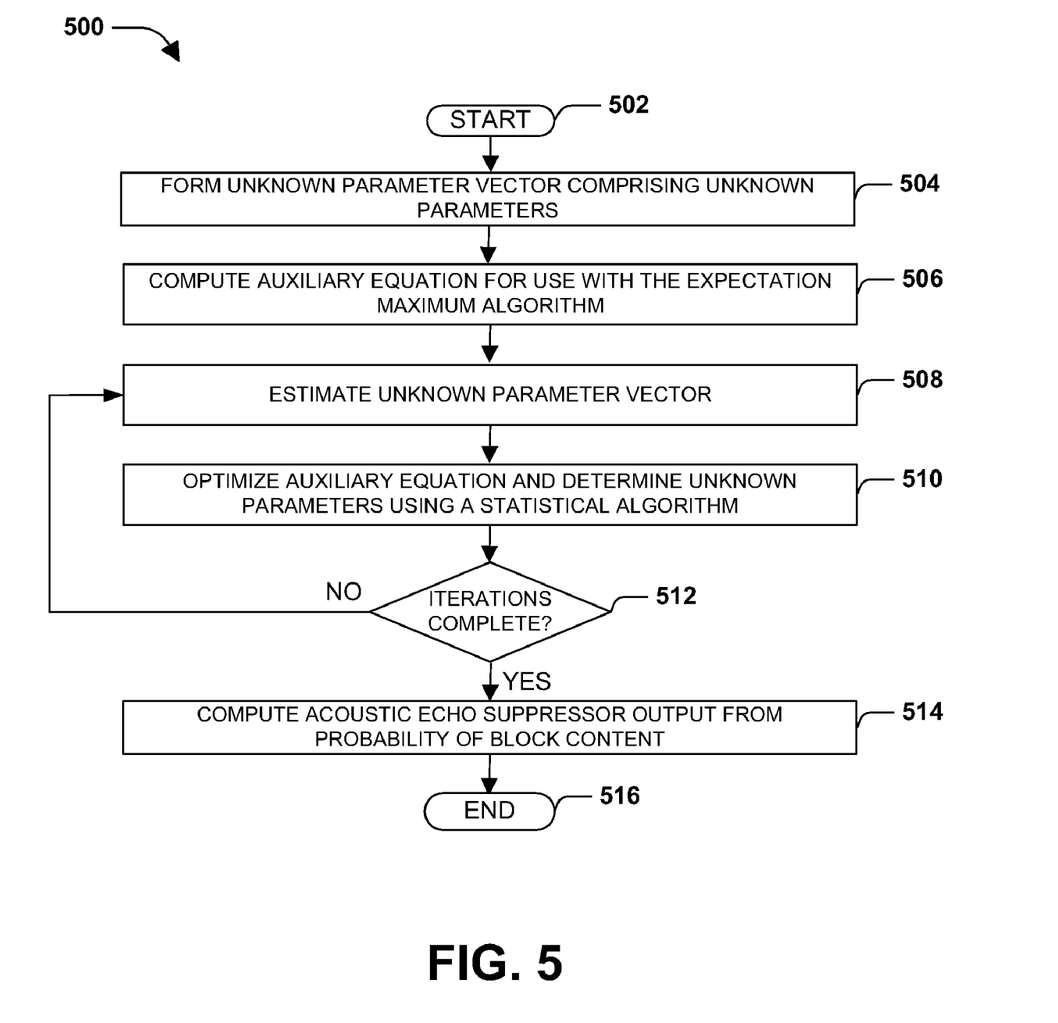
FIG. 5 is a flow chart illustrating an exemplary method of computing an acoustic echo suppression output as a function of a probability a block comprises near-end speech using an expectation maximum algorithm.

FIG. 5 illustrates a flow diagram illustrating a more in depth exemplary method of computing an acoustic echo suppression output as a function of a probability of near-end speech according to an expectation maximization algorithm. More particularly, the method 500 forms a unknown parameter vector from the unknown parameters and then constructs the unknown parameter vector as a mixture of densities problem that can be solved using the Expectation Maximization algorithm. The Expectation Maximization algorithm performs an iterative process that finds maximum likelihood estimates of the unknown parameters (e.g., finds inter alia the probability of the content of the frequency bin).

At 504 an unknown parameter vector comprising unknown parameters is formed.

$$\theta = (P(\mathcal{H}_0), P(\mathcal{H}_1), \Psi_{v1}, \Psi_{v2}, W^T)^T$$

The unknown parameter vector comprises a probability of a frequency bin comprising predominantly residual echo $P(H_1)$, a probability of a frequency bin comprising predominantly near-end signal $P(H_0)$, and unknown parameters that are determined to find the probability of observing a signal $Y(n)$ given a far end signal $Z(n)$ (e.g., defined in act 306 by the sum of the probability density functions). Formation of the unknown parameter vector $\theta$ comprising these unknown parameters allows a maximum likelihood function to be written such that the unknown parameters provide the greatest probability that given a far end signal $Z(n)$ a signal $Y(n)$ will be observed. The maximum likelihood calculation can be converted to a log likelihood function by algebraic manipulation thereby providing:

$$\Theta_{opt} = \underset{\Theta}{\operatorname{argmax}} \sum_{n=0}^{N-1} \ln\left(\sum_{i=0}^{1} \alpha_i p(Y(n) | H_i, Z(n), \Theta)\right)$$

where $P(\mathcal{H}_0)$ and $P(\mathcal{H}_0)$ are written as $\alpha_i$. The log likelihood function is difficult to enhance (e.g., optimize). However, it can be enhanced using the Expectation Maximization algorithm At 506 an auxiliary equation of the log likelihood function is computed for use with the Expectation Maximization algorithm. The auxiliary equation provides a function of the estimate of the unknown parameter vector $\theta^l$ for respective iterations:

$$Q(\Theta, \Theta^{(l)}) = \sum_{n=0}^{N-1} \sum_{i=0}^{1} \ln(P(H_i) p(Y(n) | H_i, Z(n), \Theta)) \cdot P(H_i | Y(n), Z(n), \Theta^{(l)}).$$

Once formed, the auxiliary equation of the log likelihood function can be enhanced (e.g., maximized) after slight algebraic manipulation.

At 508 the unknown parameter vector is estimated. The estimation is part of an iterative process wherein the estimation is a guess based upon the subsequent optimization (e.g., maximization) act 510. Initially, the unknown parameter vector values can be a best guess by the user, for example.

The auxiliary equation of the log likelihood function is optimized (e.g., maximized) and the unknown parameters are enhanced at 510. Maximization of the auxiliary equation can be performed by using various statistical algorithms (e.g., expectation maximization). In one example an expectation maximization method subjects the auxiliary equation to the constraint that the sum of the probabilities of the frequency bin comprising predominantly near-end noise or residual echo is equal to 1 (e.g., $\Sigma_i P(\mathcal{H}_i)$). Such a method will not be described herein as such optimization methods are beyond the inventive scope of this disclosure. Once the maximum values have been found the newly derived maximum values may be used as a guess of the unknown parameter vector $\theta^l$ for the next iteration l+1. Acts 506 and 508 may be repeated until sufficient enhancement of the unknown parameter vector $\theta^l$ is achieved. Acts 504, 506, and 508 can be performed for respective frequency bins k and respective blocks b of N frames n.

At 514 the probability $P(\mathcal{H}_0)$ is multiplied by the content of an associated frequency bin Y(k,n) (e.g., estimated parameters are applied to perform act 212 in FIG. 2) to produce an output from the AES with a reduced residual echo and a higher perceptive sound quality than produced by the AEC alone.

Figure 6:
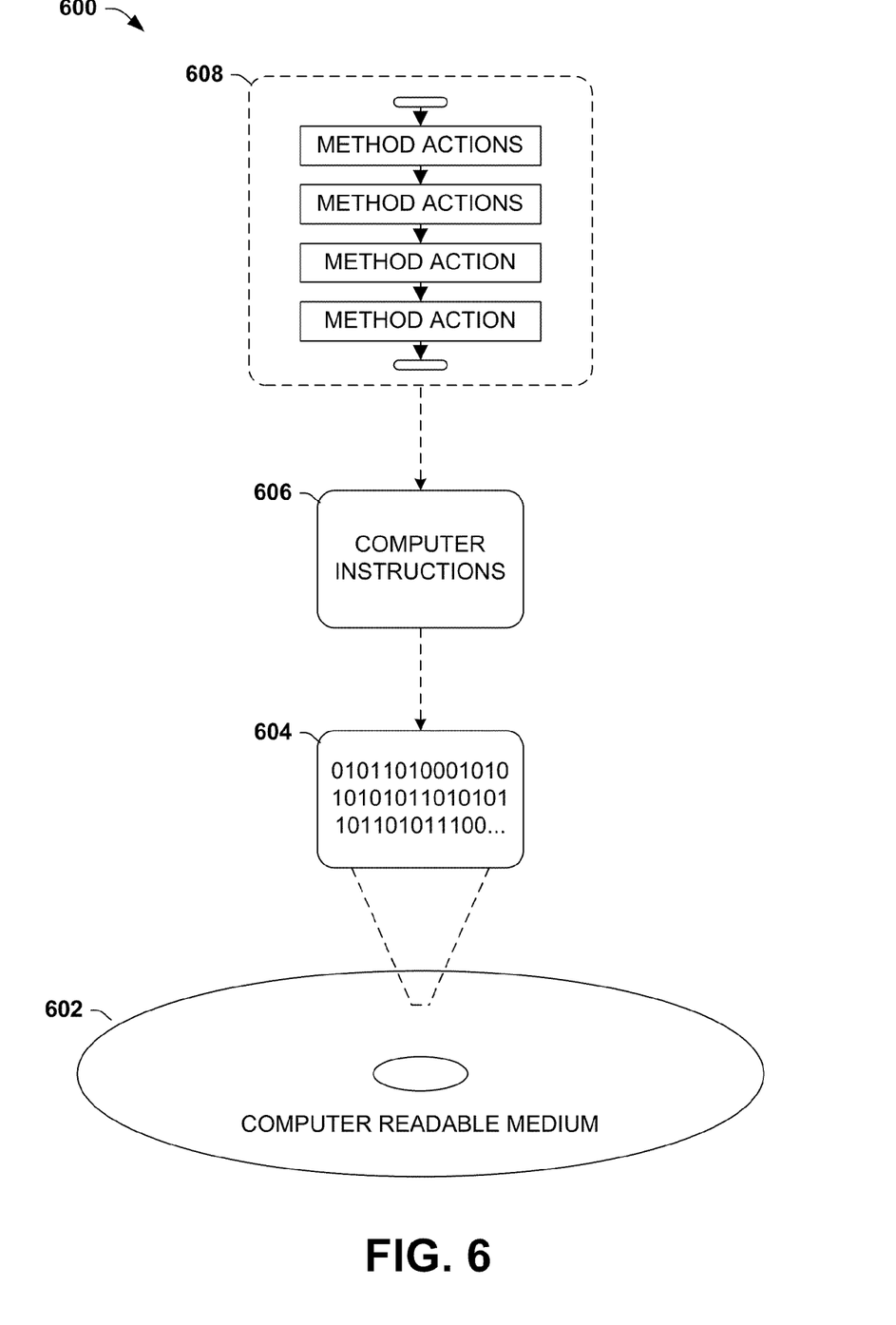
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply one or more of the techniques presented herein. An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to one or more of the principles set forth herein. In one such embodiment, the processor-executable instructions 606 may be configured to perform a method of 608, such as the exemplary method 600 of FIG. 6, for example. In another such embodiment, the processor-executable instructions 606 may be configured to implement a system configured to improve the suppression of residual echo. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
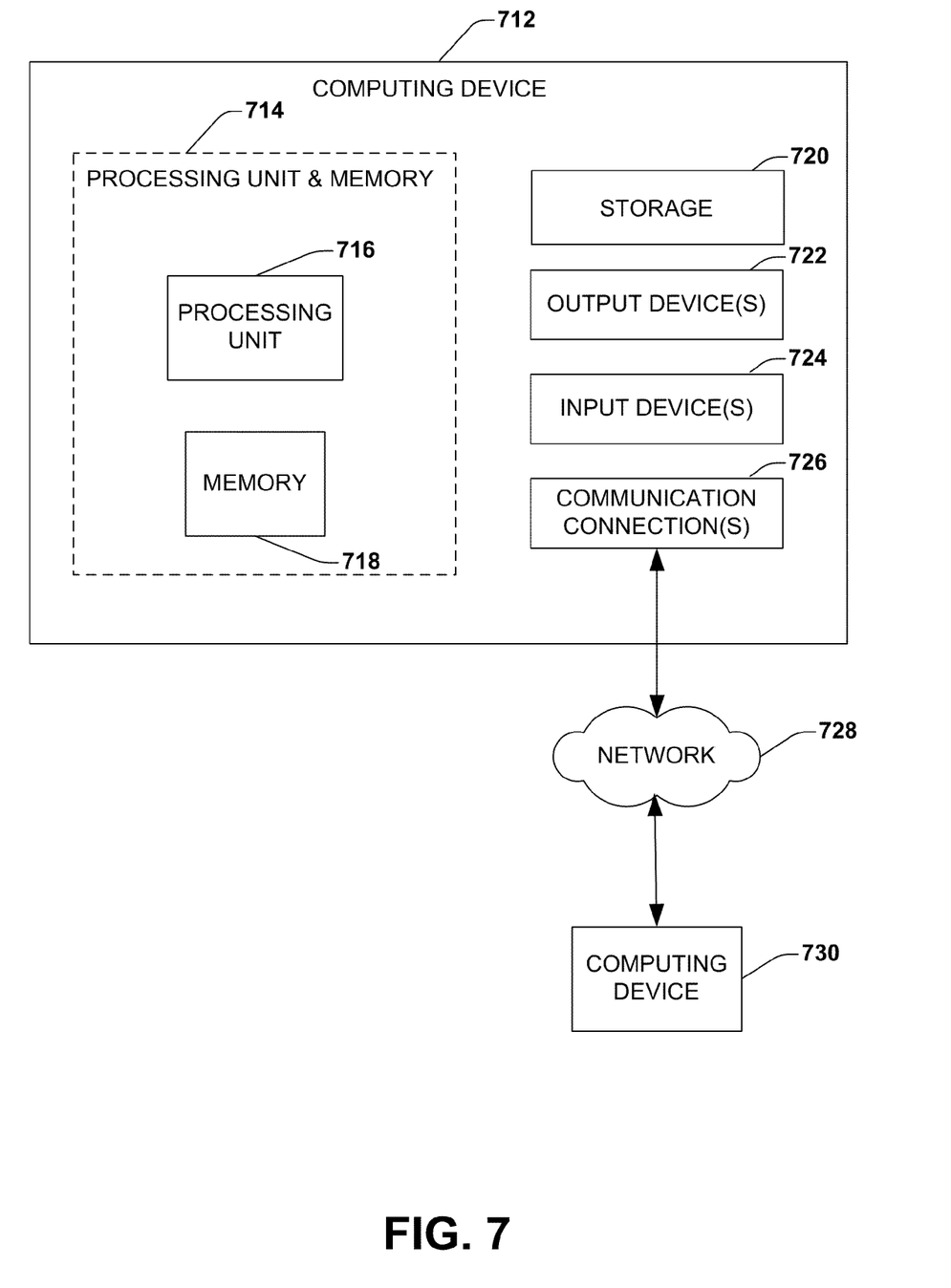
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear form context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for acoustic echo suppression comprising:
temporally segmenting a sound signal into segmented sound signals stored within a plurality a frequency bins according to frequency and time of capture, the sound signal comprising a near-end signal and a residual echo;
modeling segmented sound signals stored in respective frequency bins as a probability density function to determine a probability that respective frequency bins comprise predominantly near-end signal or predominantly residual echo, the modeling for respective frequency bins comprising:
forming an unknown parameter vector comprising unknown parameters characterizing the probability density function; and
evaluating the unknown parameter vector using a statistical approach to determine the unknown parameters; and
computing an acoustic echo suppression output having a suppressed residual echo, the acoustic echo suppression output proportional to products of segmented sound signals and probabilities associated with respective frequency bins.

2. The method of claim 1, the probability density function comprising a Gaussian distribution.

3. The method of claim 1, the statistical approach comprising an Expectation Maximization algorithm.

4. The method of claim 1, comprising:
incorporating the unknown parameter vector into a log likelihood function.

5. The method of claim 4, the log likelihood function comprising a probability that a given signal output from a speaker will be received at an acoustic echo suppressor configured to perform the method for acoustic echo suppression.

6. The method of claim 1, comprising:
performing acoustic echo cancellation (AEC) prior to temporally segmenting the sound signal.

7. The method of claim 1, comprising:
converting the sound signal to a frequency domain prior to temporally segmenting the sound signal.

8. The method of claim 1, comprising:
segmenting the sound signal into 0.01 s to 0.05 s segmented sound signals.

9. A system for acoustic echo reduction, comprising:
an acoustic echo suppressor configured to:
temporally segment a sound signal into segmented sound signals stored within a plurality a frequency bins according to frequency and time of capture, the sound signal comprising a near-end signal and a residual echo;
model segmented sound signals stored in respective frequency bins as a probability density function to determine a probability that respective frequency bins comprise predominantly near-end signal or predominantly residual echo, the modeling for respective frequency bins comprising:
forming an unknown parameter vector comprising unknown parameters characterizing the probability density function; and
evaluating the unknown parameter vector using a statistical approach to determine the unknown parameters; and
compute an acoustic echo suppression output having a suppressed residual echo, the acoustic echo suppression output proportional to products of segmented sound signals and probabilities associated with respective frequency bins.

10. The system of claim 9, comprising:
an acoustic echo canceller configured to perform acoustic echo cancellation (AEC) prior to temporally segmenting the sound signal.

11. The system of claim 9, the probability density function comprising a Gaussian distribution.

12. The system of claim 9, the statistical approach comprising an Expectation Maximization algorithm.

13. The system of claim 9, the acoustic echo suppressor configured to:
incorporate the unknown parameter vector into a log likelihood function.

14. The system of claim 13, the log likelihood function comprising a probability that a given signal output from a speaker will be received at the acoustic echo suppressor.

15. The system of claim 9, the acoustic echo suppressor configured to:
convert the sound signal to a frequency domain prior to temporally segmenting the sound signal.

16. The system of claim 9, the acoustic echo suppressor configured to:
segment the sound signal into 0.01 s to 0.05 s segmented sound signals.

17. A computer storage device comprising computer executable instructions that when executed via a processing unit perform a method for acoustic echo suppression, comprising:
temporally segmenting a sound signal into segmented sound signals stored within a plurality a frequency bins according to frequency and time of capture, the sound signal comprising a near-end signal and a residual echo;
modeling segmented sound signals stored in respective frequency bins as a probability density function to determine a probability that respective frequency bins comprise predominantly near-end signal or predominantly residual echo, the modeling for respective frequency bins comprising:
forming an unknown parameter vector comprising unknown parameters characterizing the probability density function; and
evaluating the unknown parameter vector using a statistical approach to determine the unknown parameters; and
computing an acoustic echo suppression output having a suppressed residual echo, the acoustic echo suppression output proportional to products of segmented sound signals and probabilities associated with respective frequency bins.

18. The method of claim 17, the probability density function comprising a Gaussian distribution.

19. The method of claim 17, the statistical approach comprising an Expectation Maximization algorithm.

20. The method of claim 17, comprising:
incorporating the unknown parameter vector into a log likelihood function, the log likelihood function comprising a probability that a given signal output from a speaker will be received at an acoustic echo suppressor configured to perform the method for acoustic echo suppression.

* * * * *